United States Patent
Shah et al.

(10) Patent No.: US 7,277,945 B1
(45) Date of Patent: Oct. 2, 2007

(54) SYSTEM AND METHOD FOR MAINTAINING SEAMLESS SESSION OPERATION

(75) Inventors: Gaurang K. Shah, Cary, NC (US); Chris O'Rourke, Apex, NC (US); Pranav K. Tiwari, Bangalore (IN); Mark Albert, Morrisville, NC (US); Ethan M. Young, Apex, NC (US); Barron C. Housel, Chapel Hill, NC (US)

(73) Assignee: Cisco Technology, Inc., San Jose, CA (US)

(\*) Notice: Subject to any disclaimer, the term of this patent is extended or adjusted under 35 U.S.C. 154(b) by 1113 days.

(21) Appl. No.: 09/952,955

(22) Filed: Sep. 12, 2001

(51) Int. Cl.
G06F 15/173 (2006.01)

(52) U.S. Cl. .................. 709/226; 709/223; 709/225; 709/227; 709/228; 709/238

(58) Field of Classification Search ................ 709/219, 709/203, 238, 217, 223–229
See application file for complete search history.

(56) References Cited

U.S. PATENT DOCUMENTS

| | | | |
|---|---|---|---|
| 5,303,238 A * | 4/1994 | Brodd et al. ................ 370/402 |
| 5,835,724 A * | 11/1998 | Smith ........................ 709/227 |
| 5,951,694 A * | 9/1999 | Choquier et al. ............ 714/15 |
| 5,983,281 A * | 11/1999 | Ogle et al. .................. 709/249 |
| 6,098,093 A * | 8/2000 | Bayeh et al. ................ 709/203 |
| 6,199,110 B1 * | 3/2001 | Rizvi et al. ................. 709/227 |
| 6,223,215 B1 * | 4/2001 | Hunt et al. .................. 709/217 |
| 6,349,337 B1 * | 2/2002 | Parsons et al. ............. 709/227 |
| 6,373,585 B1 | 4/2002 | Mastie et al. |
| 6,374,277 B2 | 4/2002 | Vong et al. |
| 6,490,610 B1 * | 12/2002 | Rizvi et al. ................. 718/101 |
| 6,560,717 B1 | 5/2003 | Scott et al. |
| 6,718,359 B2 * | 4/2004 | Zisapel et al. .............. 718/105 |
| 6,760,759 B1 * | 7/2004 | Chan .......................... 709/219 |
| 6,760,765 B1 * | 7/2004 | Asai et al. .................. 709/226 |
| 6,766,373 B1 * | 7/2004 | Beadle et al. ............... 709/227 |
| 6,772,333 B1 | 8/2004 | Brendel |
| 6,779,017 B1 | 8/2004 | Lamberton et al. |
| 6,785,726 B1 | 8/2004 | Freeman et al. |
| 6,792,463 B1 * | 9/2004 | Lamberton et al. ......... 709/227 |
| 6,807,580 B2 | 10/2004 | Freeman et al. |
| 6,826,606 B2 | 11/2004 | Freeman et al. |
| 6,873,620 B1 * | 3/2005 | Coveley et al. ......... 370/395.31 |
| 6,920,502 B2 * | 7/2005 | Araujo et al. ............... 709/229 |
| 6,922,724 B1 | 7/2005 | Freeman et al. |
| 6,947,992 B1 * | 9/2005 | Shachor ...................... 709/228 |
| 6,959,436 B2 * | 10/2005 | Peng .......................... 719/310 |
| 7,003,574 B1 * | 2/2006 | Bahl .......................... 709/228 |

\* cited by examiner

*Primary Examiner*—Saleh Najjar
*Assistant Examiner*—Faruk Hamza
(74) *Attorney, Agent, or Firm*—Baker Botts L.L.P.

(57) ABSTRACT

A network (10) includes a load balancer (18) that passes traffic between a client (14) and a gateway (20). For initial messages from a client (14), the load balancer (18) selects an appropriate gateway (20) for message processing. A session is then established between the client (14) and the appropriate gateway (20). The session is indicated by a session identifier. At any point, the client (14) may choose to suspend the session for later resumption. Upon suspension, the load balancer (18) keeps track of the session identifier and the appropriate gateway (20) associated with the session. Upon a resumption request from the client (14), the load balancer (18) determines which of the gateways (20) is associated with the resumption request according to the session identifier. In this manner, the client may continue a session with the same gateway (20) for seamless operation.

21 Claims, 2 Drawing Sheets

SYSTEM AND METHOD FOR MAINTAINING SEAMLESS SESSION OPERATION

TECHNICAL FIELD OF THE INVENTION

The present invention relates in general to information transfer and processing and more particularly to a system and method for maintaining seamless session operation.

BACKGROUND OF THE INVENTION

A Wireless Access Protocol (WAP) load balancer is a device that distributes WAP traffic received over a wireless network on an Internet Protocol (IP) bearer network among a group of WAP gateways. Each WAP gateway translates requests from the WML stack to a WWW protocol stack, such as HTML and TCP/IP. The WAP gateway encodes and decodes web content to reduce the size and number of packets traveling over the wireless network. The WAP gateway interfaces with subscriber databases in order to provide client specific services.

Because of the growth and size of the wireless subscriber market, content customers providing WAP services are quickly experiencing more bottlenecks at their WAP gateways. The WAP load balancer is used to distribute WAP traffic among WAP gateways in order to relieve and avoid bottlenecks in the system. With multiple WAP gateways, the WAP load balancer must ensure that all packets associated with a single session are sent to the same WAP gateway. A Wireless Session Protocol (WSP) is a session layer protocol for operation between a WAP client and a WAP gateway. The WSP allows for sessions to be suspended and resumed without the overhead of session tear-down and re-establishment. When a session is established, a session entry is set up in a database indexed by a session identifier. The suspend facility allows a wireless service provider to change the underlying network bearer resources. The session state is initially maintained using header information in the IP packets identifying source/destination IP addresses and/or source/destination port numbers. However, a subsequent resume request may arrive with a different IP source and port number. If this occurs, a query to a session state database will fail and the session will not be resumed at the previously chosen WAP gateway. Therefore, it is desirable to select a previously chosen WAP gateway in response to a suspend and resume operation.

SUMMARY OF THE INVENTION

From the foregoing, it may be apparent that a need has arisen to maintain seamless operation of information transfer between a client and a particular gateway despite suspension of activity between the client and the particular gateway. In accordance with the present invention, a system and method for maintaining seamless session operation are provided that substantially eliminate or greatly reduce disadvantages and problems associated with conventional session operations.

According to an embodiment of the present invention, there is provided a system for maintaining seamless session operation that includes a client that sends a request message within a session. A gateway receives and processes the request message from the client for the session. The gateway provides a reply message to the client in response to the request message. A load balancer assigns the request message to the gateway, the load balancer maintains a record of the session in response to a suspend request from the client. The load balancer re-establishes communications between the client and the gateway according to the record of the session in response to a resume request from the client.

The present invention provides various technical advantages over conventional session operations. For example, one technical advantage is to maintain seamless session operation despite suspension and resumption of the session. Another technical advantage is to provide a capability to identify a particular client and gateway for the session. Yet another technical advantage is to provide session identifier conversion for unique identification of a session. Other technical advantages may be readily apparent to those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE DRAWINGS

Figure 1:
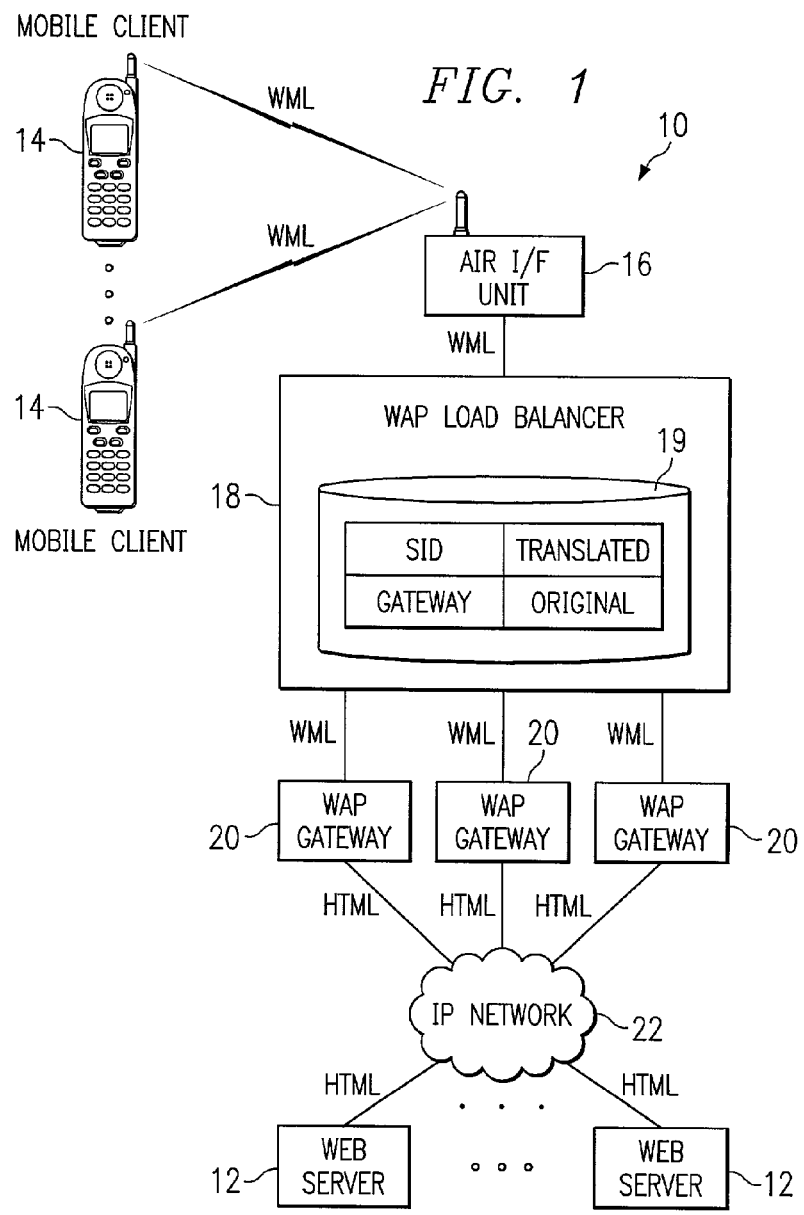
FIG. 1 illustrates a block diagram of a wireless access protocol network.

FIG. 1 is a block diagram of a wireless access protocol (WAP) network 10. WAP network 10 provides access to and from a web server 12 for a mobile WAP client 14. WAP network 10 includes a air interface unit 16 to receive and transmit WAP traffic in a Wireless Markup Language (WML) from and to WAP client 14. WAP traffic received from WAP client 14 by air interface unit 16 is provided to a WAP load balancer 18. WAP load balancer 18 assigns the WAP traffic to one of a plurality of WAP gateways 20 using a database 19. Each WAP gateway 20 converts the WAP traffic from the WML format to a Hyper Text Markup Language (HTML) format. The WAP traffic in the HTML format is passed onto web server 12 through an Internet Protocol (IP) network 22.

Web server 12 generates a response in the HTML associated with the received WAP traffic request. The response is sent to the appropriate WAP gateway 20 through IP network 22. WAP gateway converts the response from the HTML format to the WML format. WAP gateway passes the response in the WML format to WAP load balancer 18 for transmission to WAP client 14 through air interface 16.

Communications between WAP gateway 20 and WAP mobile client 14 operate according to a session layer protocol such as a Wireless Session Protocol (WSP). WSP allows for sessions to be suspended and resumed. If a session is suspended, WAP load balancer 18 will need to know which WAP gateway 20 to which WAP mobile client 14 was communicating in order to provide a seamless and transparent operation upon the resumption of the session.

Figure 2:
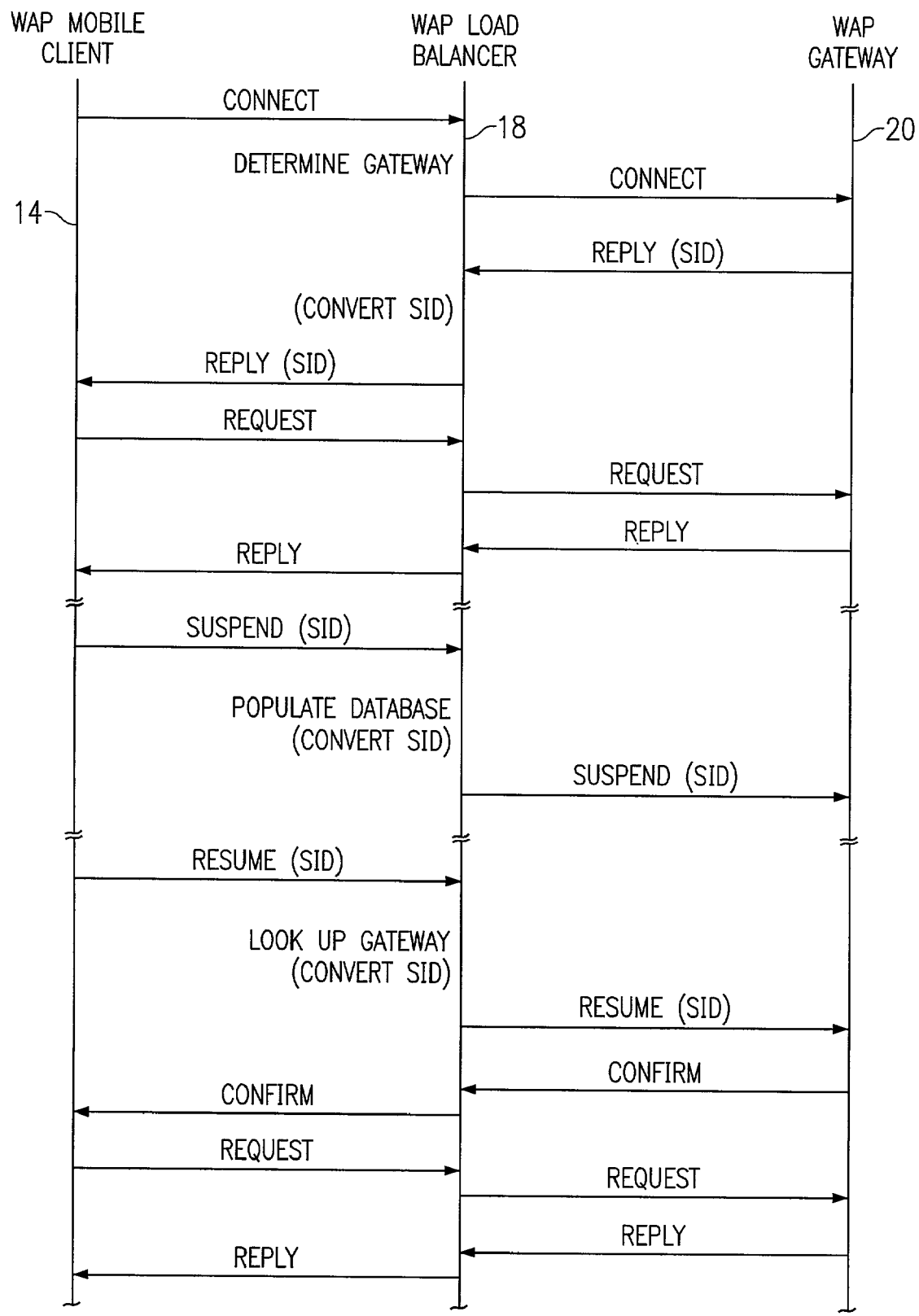
FIG. 2 illustrates operation of the wireless access protocol network.

FIG. 2 shows an example of a session between WAP mobile client 14 and WAP gateway 20 through WAP load balancer 18. WAP mobile client 14 initiates a session by sending a CONNECT message in order to establish communications with a WAP gateway 20. WAP load balancer 18 receives the CONNECT message and determines which one of the WAP gateways 20 is to interact with this WAP mobile client 14. This determination may be accomplished through any of a variety of techniques, including sophisticated priority schemes and assignments or simple cyclical round robin fashion. Once determined, the CONNECT message is forwarded to the assigned WAP gateway 20. WAP gateway 20 returns a REPLY message that includes a session identifier (SID) to indicate the particular session with WAP mobile client 14. WAP load balancer 14 relays the REPLY message with the SID to WAP mobile client 14. WAP mobile client 14 then initiates REQUEST messages and receives REPLY messages in response thereto until the session is terminated.

At some point in the session, WAP mobile client 14 may desire to temporarily suspend the session for subsequent later resumption. WAP mobile client 14 sends a SUSPEND message that includes the SID for the session. WAP load balancer 18 receives the SUSPEND message with the SID and populates a database to correlate the SID with the assigned WAP gateway 20 for the session. The SUSPEND message is then forwarded to WAP gateway 20 for processing.

Upon desiring to resume a session, WAP mobile client 14 sends a RESUME message with the SID. WAP load balancer receives the RESUME message, looks up the SID in its database to identify the assigned WAP gateway 20, and forwards the RESUME message to the identified WAP gateway 20. WAP gateway 20 may send a CONFIRM message to WAP mobile client 14 through WAP load balancer 18. The previously suspended session between WAP mobile client 14 and the assigned WAP gateway 20 is resumed. REQUEST and REPLY messages may once again flow between WAP mobile client 14 and WAP gateway 20 as if the session had not been suspended. In this manner, WAP mobile client 14 may communicate with the same WAP gateway 20 throughout a session regardless of whether the session is suspended and subsequently resumed. Numerous suspensions may take place in a single session while still providing the capability to connect to the same WAP gateway 20.

Because of the multiple gateway environment, it may be possible for two WAP mobile clients 14 to have sessions ongoing with separate WAP gateways 20 that use the same SID. If both WAP mobile clients 14 suspend their sessions, WAP load balancer 18 may have two entries for a single SID that identify different WAP gateways 20, bringing the possibility that a resumed session from either or both of the WAP mobile clients 14 may not be with the appropriate WAP gateway 20. One technique to avoid this SID collision possibility is to assign a range of SIDs to each WAP gateway 20. For example, a first WAP gateway 20 may only assign SIDs in the range of 00-99 while a second WAP gateway may only assign SIDs in the range of 100-199. This will guarantee that WAP load balancer 18 sees unique SIDs. In order to add other WAP gateways 20, the SID ranges would have to be communicated among the WAP gateways 20 being handled by WAP load balancer 18 through a load balancer specific configuration in each WAP gateway 20. WAP gateways 20 may negotiate among themselves for unique SIDs or each WAP gateway 20 may be separately configured with unique SID ranges.

To avoid having to put some type of WAP load balancer specific configuration in each WAP gateway 20 or to add negotiation and/or configuration support to each WAP gateway 20, WAP load balancer 18 may be configured to translate the SID assigned by WAP gateway 20 for a given session to a unique value so that WAP gateways 20 may continue to use generic SID assignment without worrying about what SIDs other WAP gateways 20 are assigning. Messages between WAP gateways 20 and WAP load balancer 18 will have original SIDs while messages between WAP mobile client 14 and WAP load balancer 18 will have translated SIDs determined by WAP load balancer 18 from the original SIDs. WAP load balancer 18 may perform the conversion between original and translated SIDs using database 19.

Figure 3A:
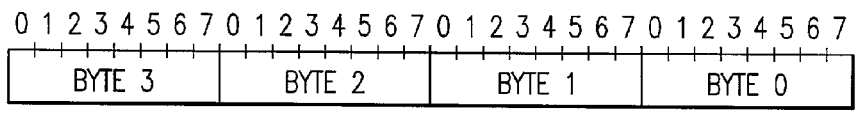
FIGS. 3A-B show the conversion of session identifiers by a load balancer of the wireless access protocol network.
Figure 3B:
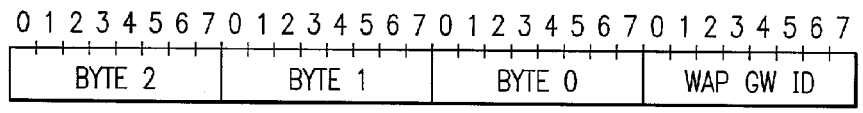

FIGS. 3A-B show an example of the conversion between an original SID and a translated SID. FIG. 3A shows an example of an original SID assigned and provided by a WAP gateway 20. The original SID may be an encoded value using a variable length unsigned integer. The larger the unsigned integer, the larger the size of its encoding. The four byte original SID is converted by WAP load balancer 18 into a translated SID, an example of which is shown in FIG. 3B. The translated SID is provided by WAP load balancer 18 to WAP mobile client 14. The translated SID includes bytes 0, 1, and 2 from the original SID and a gateway identifier byte. The least significant bits of the translated SID are used for the gateway identifier byte in order to preserve the variable length unsigned integer encoding of the original SID. Through the use of the gateway identifier byte, WAP load balancer 18 can support 255 WAP gateways 20. To support more WAP gateways 20, more bits may be used or different encoding may be applied to the gateway identifier byte.

Returning to FIG. 2, upon establishing a connection with WAP mobile client 14, WAP gateway sends its REPLY message that includes the assigned original SID. WAP load balancer converts the original SID to a translated SID through internal database operations and forwards the REPLY message with the translated SID to WAP mobile client 14. Upon receiving a SUSPEND message from WAP mobile client 14, WAP load balancer 18 converts the translated SID in the SUSPEND message into its original SID for forwarding to WAP gateway 20. Similarly, WAP load balancer 18 converts the translated SID in the RESUME message to its original SID for forwarding to the appropriate WAP gateway 20. The translated SID includes information as to the identification of the appropriate WAP gateway 20 with which WAP load balancer 18 can use to compare or look up to find the appropriate WAP gateway 20 for seamless session operation.

Thus, it is apparent that there has been provided, in accordance with the present invention, a system and method of maintaining seamless session operation that satisfies the advantages set forth above. Although the present invention has been described in detail, various changes, substitutions, and alterations may be readily ascertainable by those skilled in the art. For example, though described with respect to a wireless environment, the present invention may apply equally to non-wireless environments. Moreover, the conversion from an original SID to a translated SID may be performed in any desired manner that can still identify the serving WAP gateway. Other examples may be readily apparent to those skilled in the art and may be made herein without departing from the spirit and scope of the present invention as defined by the following claims.

What is claimed is:

1. A system for maintaining seamless session operation, comprising:

a client operable to send a request message within a session;

a plurality of gateways operable to receive and process the request message received from the client for the session, the plurality of gateways operable to provide a reply message to the client in response to the request message;

a load balancer operable to receive the request message from the client, the load balancer operable to assign the request message to a particular one of the plurality of gateways, the load balancer operable to maintain a record of the session in response to a suspend request from the client, the load balancer operable to re-establish session communications between the client and the particular one of the plurality of gateways according to the record of the session in response to a resume request from the client.

2. The system of claim 1, wherein the gateway assigns an original session identifier for the session between the gateway and the client, the gateway providing the session identifier to the client through the load balancer.

3. The system of claim 2, wherein the load balancer includes a database operable to provide a relationship between the session identifier and the gateway.

4. The system of claim 3, wherein the client issues the suspend request, the suspend request including the session identifier, the load balancer operable to populate the database with the relationship between the original session identifier and the gateway.

5. The system of claim 4, wherein the load balancer receives a resume request from the client, the resume request including the session identifier, the load balancer operable to determine that the session identifier is associated with the gateway through a look up in the database.

6. The system of claim 5, wherein the session identifier provided by the gateway is an original session identifier, load balancer operable to convert the original session identifier to a translated session identifier, the translated session identifier including an indication of identity for the gateway, the load balancer operable to provide the translated session identifier to the client.

7. The system of claim 6, wherein the client provides the translated session identifier in the resume request, the load balancer operable to convert the translated session identifier to the original session identifier and forward the resume request to the gateway in response to the gateway being identified in the translated session identifier.

8. The system of claim 1, wherein each gateway has a unique range of session identifiers to identify each session.

9. The system of claim 8, wherein the unique range of session identifiers is configurable in each gateway.

10. A device for maintaining seamless session operation, comprising:
a load balancer operable to select one of a plurality of gateways for processing traffic from a client, the load balancer operable to receive a session identifier from a selected gateway and provide the session identifier to the client upon establishment of a session between the client and the selected gateway, the load balancer operable to receive a suspend request from the client, the suspend request including the session identifier, the load balancer including a database to maintain a relationship between the session identifier and the selected gateway, the load balancer operable to receive a resume request from the client, the resume request including a session identifier, the load balancer operable to re-establish a session connection between the client and the selected gateway in response to the database indicating that the session identifier of the resume request corresponds to the selected gateway.

11. The device of claim 10, wherein the session identifier received by the load balancer from the selected gateway is an original session identifier, the load balancer operable to convert the original session identifier into a unique translated session identifier, the translated session identifier including an indication of an identity of the selected gateway.

12. The device of claim 11, wherein the database maintains a relationship between the original session identifier and the translated session identifier.

13. The device of claim 11, wherein the load balancer provides the translated session identifier to the client.

14. The device of claim 13, wherein the session identifier received from the client in the resume request is a translated session identifier, the load balancer operable to convert the translated session identifier to an original session identifier, the load balancer operable to forward the original session identifier to the selected gateway in response to the translated session identifier in the resume request indicating the identity of the selected gateway.

15. A method for maintaining seamless operation of a session, comprising:
establishing communications for a session between a client and a selected one of a plurality of gateways;
receiving a session identifier from the selected one of the plurality of gateways;
associating the session identifier to the selected one of the plurality of gateways;
providing the session identifier to the client;
receiving a suspend request from the client, the suspend request including a session identifier corresponding to the session between the client and the selected one of the plurality of gateways;
halting the session in response to the suspend request;
receiving a resume request from the client, the resume request including a session identifier;
determining whether the session identifier in the resume request corresponds to the session between the client and the selected one of the plurality of gateways;
resuming the session in response to the session identifier corresponding to the session and the selected one of the plurality of gateways.

16. The method of claim 15, further comprising:
converting the session identifier received from the selected one of the plurality of gateways into a translated session identifier, the session identifier received from the selected one of the plurality of gateways being an original session identifier, the translated session identifier including an indication of an identity of the selected one of the plurality of gateways;
providing the translated session identifier to the client.

17. The method of claim 16, wherein the translated session identifier is unique among all of the plurality of gateways.

18. The method of claim 16, wherein the session identifier received in the resume request is a translated session identifier.

19. The method of claim 18, further comprising:
converting the translated session identifier received with the resume request into an original session identifier;
determining whether the selected one of the plurality of gateways is associated with the translated session identifier received with the resume request;
forwarding the resume request and original session identifier to the selected one of the plurality of gateways in response to the translated session identifier of the resume request indicating the identity of the selected one of the plurality of gateways.

20. A system for maintaining seamless operation of a session, comprising:

means for establishing communications for a session between a client and a selected one of a plurality of gateways;

means for receiving a session identifier from the selected one of the plurality of gateways;

means for associating the session identifier to the selected one of the plurality of gateways;

means for providing the session identifier to the client;

means for receiving a suspend request from the client, the suspend request including a session identifier corresponding to the session between the client and the selected one of the plurality of gateways;

means for halting the session in response to the suspend request;

means for receiving a resume request from the client, the resume request including a session identifier;

means for determining whether the session identifier in the resume request corresponds to the session between the client and the selected one of the plurality of gateways;

means for resuming the session in response to the session identifier corresponding to the session and the selected one of the plurality of gateways.

21. The system of claim 20, further comprising:

converting the session identifier received from the selected one of the plurality of gateways into a translated session identifier, the session identifier received from the selected one of the plurality of gateways being an original session identifier, the translated session identifier including an indication of an identity of the selected one of the plurality of gateways;

providing the translated session identifier to the client, wherein the translated session identifier is unique among all of the plurality of gateways.

* * * * *